J. J. HANNON.
MILK BOTTLE CONTAINER.
APPLICATION FILED MAY 16, 1919.
1,311,966. Patented Aug. 5, 1919.
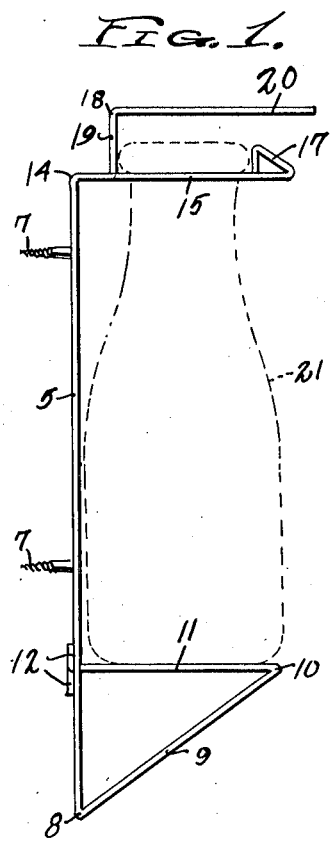
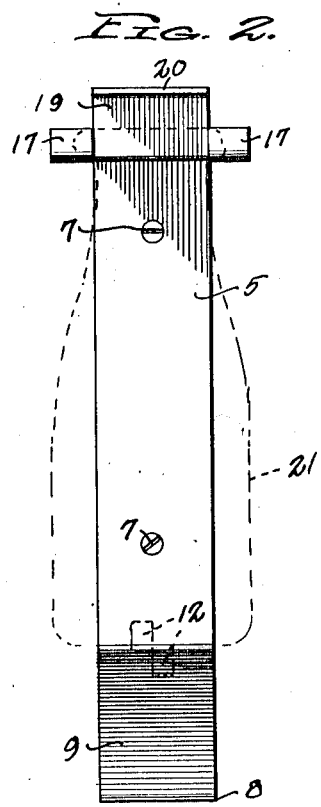
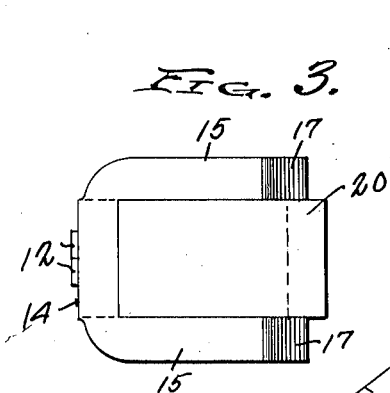
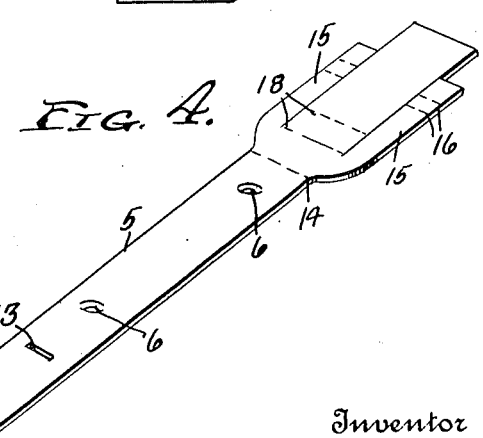
Inventor
Joseph J. Hannon

UNITED STATES PATENT OFFICE.

JOSEPH JOHN HANNON, OF MAYNARD, MASSACHUSETTS.

MILK-BOTTLE CONTAINER.

1,311,966.                       Specification of Letters Patent.     Patented Aug. 5, 1919.

Application filed May 16, 1919. Serial No. 297,570.

*To all whom it may concern:*

Be it known that I, JOSEPH JOHN HANNON, a citizen of the United States, residing at Maynard, in the county of Middlesex and State of Massachusetts, have invented certain new and useful Improvements in Milk-Bottle Containers, of which the following is a specification.

This invention is a milk bottle container and has for its principal object the production of a simplified construction which is adapted to be fixed upon a supporting structure in position where a milk bottle may be easily placed in engagement therewith and be firmly and properly retained.

Another object of this invention is the production of a milk bottle container which is formed from a blank strip of material thus minimizing the cost of production thereof, this strip being folded to provide an efficient supporting means for properly retaining a milk bottle without danger of the milk bottle being accidentally displaced.

Another object of this invention is the production of a milk bottle container formed from a blank strip of material and folded to provide a supporting base at its lower portion and a retaining means at its upper portion, thus efficiently supporting the milk bottles although holding the same against accidental displacement.

One practical form of construction and assembly of the present invention will be hereinafter described, and is illustrated in the drawing, in which—

Figure 1 is a side elevation of the completed milk bottle container.

Fig. 2 is a front elevation of the device.

Fig. 3 is a top plan view of the device.

Fig. 4 is a detail perspective view of the blank from which the milk bottle container is formed.

In the preferred embodiment of the present invention about to be specifically described, attention is invited to Fig. 4 wherein the blank from which the milk bottle container is formed, is illustrated. The device is formed from an elongated strip of material and comprises a body 5 having openings 6 therein whereby screws 7 may be passed therethrough for fixing the milk bottle container upon a desired support. This body 6 is bent at its lower end at 8 and is then slanted upwardly and forwardly to provide the brace portion 9. This brace portion 9 is bent at 10 to provide the inwardly extending horizontal shelf 11, as shown in Fig. 1. The inner end of the shelf is provided with a pair of tongues 12 which are passed through the transverse slot 13 formed in the body 5 and are then bent in opposite directions as illustrated in Figs. 1 and 2, whereby the base portion thus described will be firmly held in an assembled condition. The upper end of the body is enlarged and is bent at right angles thereto as indicated at 14. This enlarged end is slit longitudinally with parallel slits, thus forming parallel arms 15, which have their outer end portions bent as indicated at 16 to form the substantially triangular retaining sleeves 17. The portion of the material between the arms 15 is bent at 18 to form the rear wall 19 of the cover 20. This cover 20 is spaced above the arms 15 as indicated in Figs. 1 and 2.

In use, the device is assembled as described and illustrated and is fixed upon a support as hereinbefore specified. A milk bottle, as indicated in dotted lines at 21 may have its upper end slipped over the retaining sleeves 17 and then finally rested upon the arms 15 behind the sleeves 17 as shown clearly in Fig. 1. At this time, the lower portion of the milk bottle will be resting upon a shelf 11, thus causing the bottle to be efficiently supported. However, it will be seen that as the sleeves 17 are in front of the rib of the milk bottle as shown in Figs. 1 and 2, it will be impossible for the milk bottle to accidentally slip forwardly and be displaced. Accordingly, the arms and sleeves will firmly hold the milk bottle in position upon the shelf 11, thus causing the bottle to be efficiently supported. The cover 20 will at this time be extending above the cap of the milk bottle and will efficiently guard the same against accidental injury or against rain, keeping the same in a sanitary condition.

It will therefore be seen that a very simple and yet efficient milk bottle container is disclosed which is formed from a blank and as it is formed from a single piece of material, the possibility of the same becoming injured when in use is greatly minimized. It can be manufactured at a very small cost and can be very easily installed for use. When in position a milk bottle may be easily placed in engagement therewith and will then be firmly retained in position although when desired the milk bottle may be very easily removed. The simplicity of construction insures perfect operation and as there are no springs, or movable jaws which may become rusted or may become opened when in use, and notwithstanding the simplicity of construction, the efficiency of operation is not in any way minimized but in fact is increased.

The foregoing description and drawings have reference to the preferred embodiment of my invention. It is to be understood, however, that such changes may be made in the construction and assembly of parts, materials, dimensions, etc., as may properly come within the scope of the appended claims.

Having thus fully described my invention what I claim as new and desire to secure by Letters Patent is:—

1. As a new article of manufacture, a milk bottle container formed from a blank strip of material and comprising a body, said body being bent at its lower end to form an upwardly slanting brace, said brace having an inwardly bent portion forming a horizontal shelf, said body having a transverse slot therein, tongues extending from said shelf and being passed through said slot and then being bent to engage the rear surface of the body, thus holding the lower portion of the device in a folded condition to form a brace portion upon which a milk bottle may be placed and a retaining means at the upper end of said body.

2. As a new article of manufacture, a milk bottle container comprising a body, said body being folded at its lower end to provide a retaining base portion, the upper portion of said body being enlarged and bent at right angles, said enlarged portion being split to provide parallel arms, said arms being folded at their outer ends to provide substantially triangular retaining sleeves, the portion between said arms being bent upwardly and forwardly to provide a cover whereby the upper portion of the milk bottle may be received by said arms and held against displacement by said sleeve and be protected by said cover, while the lower portion of the milk bottle will rest upon said base portion.

3. As a new article of manufacture, a milk bottle container formed from a blank sheet of material and comprising an elongated body, said body being folded at its lower end to provide an upwardly and forwardly slanting brace, said brace being bent inwardly to provide a horizontal shelf, said body having a transverse slot, tongues extending from said shelf and being passed through said slot and being bent to engage the rear surface of said body, the upper portion of said body being enlarged and bent at right angles, said enlarged portion being slit parallel to form parallel arms, said arms being folded at their outer ends to provide retaining sleeves and the material between said arms being bent upwardly and forwardly to provide a protector cover, whereby milk bottles may be rested on said shaft, while the upper portion of the bottle will be engaged by said arms and held against displacement by said sleeve, while said cover will protect the cap of said milk bottle.

4. As a new article of manufacture, a milk bottle container comprising a body, the upper portion of said body being enlarged and bent at right angles, said enlarged portion being slit to provide parallel arms, said arms being folded at their outer ends to form retaining sleeves, the portion between said arms being bent upwardly and forwardly to provide the cover, whereby the upper portion of the milk bottle may be received by said arms and held against displacement by said sleeve and be protected by said cover.

5. As a new article of manufacture, a milk bottle container comprising a body having an end portion bent at right angles and slit to provide parallel arms, said arms being folded at their outer ends to provide retaining sleeves whereby a milk bottle may be supported upon said arms and held against displacement by said sleeves.

6. As a new article of manufacture, a milk bottle container comprising a body having an end portion bent at right angles thereto and slit to form parallel arms, retaining means at the forward ends of said arms, the portion between said arms being bent upwardly and forwardly to provide a cover whereby the upper portion of a milk bottle may be received by said arms and held against displacement by said means and be protected by said cover.

In testimony whereof I affix my signature in presence of two witnesses.

JOSEPH JOHN HANNON.

Witnesses:
EDWARD F. LEDGARD.
RICHARD JACKSON.